(12) United States Patent
Oshima et al.

(10) Patent No.: US 8,456,591 B2
(45) Date of Patent: Jun. 4, 2013

(54) LIQUID CRYSTAL DISPLAY DEVICE

(75) Inventors: Tetsuya Oshima, Mobara (JP);
Hirotaka Imayama, Mobara (JP);
Yasuhisa Shiraishi, Mobara (JP);
Yoshiharu Nagae, Hitachi (JP)

(73) Assignees: Hitachi Displays, Ltd., Chiba (JP);
Panasonic Liquid Crystal Display Co., Ltd., Hyogo-Ken (JP)

( * ) Notice: Subject to any disclaimer, the term of this patent is extended or adjusted under 35 U.S.C. 154(b) by 810 days.

(21) Appl. No.: 12/608,171

(22) Filed: Oct. 29, 2009

(65) Prior Publication Data
US 2010/0110333 A1    May 6, 2010

(30) Foreign Application Priority Data
Oct. 30, 2008   (JP) .................. 2008-279537

(51) Int. Cl.
*G02F 1/13357*    (2006.01)
*F21V 8/00*       (2006.01)

(52) U.S. Cl.
USPC ............................ 349/65; 362/607

(58) Field of Classification Search
USPC ................. 349/61, 62, 64, 65, 141; 362/606, 362/607, 625, 626, 97.2
See application file for complete search history.

(56) References Cited

U.S. PATENT DOCUMENTS

| | | | | |
|---|---|---|---|---|
| 5,126,863 | A  * | 6/1992 | Otsuka et al. | 349/95 |
| 5,724,108 | A  * | 3/1998 | Shibata | 349/62 |
| 6,595,652 | B2 * | 7/2003 | Oda et al. | 362/609 |
| 2003/0214724 | A1* | 11/2003 | Fujikawa et al. | 359/630 |
| 2005/0259440 | A1* | 11/2005 | Onishi et al. | 362/613 |
| 2007/0076434 | A1* | 4/2007 | Uehara et al. | 362/616 |
| 2009/0009688 | A1* | 1/2009 | Koganezawa et al. | 349/65 |

FOREIGN PATENT DOCUMENTS

| | | |
|---|---|---|
| JP | 6-59287 | 3/1994 |
| JP | 2005-160750 | * 6/2005 |

* cited by examiner

*Primary Examiner* — Dung Nguyen
*Assistant Examiner* — Tai Duong
(74) *Attorney, Agent, or Firm* — Antonelli, Terry, Stout & Kraus, LLP.

(57) ABSTRACT

A liquid crystal display device includes a liquid crystal display panel, and a backlight which is arranged on a back surface of the liquid crystal display panel, wherein the backlight includes a plurality of optical sheets, and at least one optical sheet is displaced so as to adjust a viewing angle.

6 Claims, 5 Drawing Sheets

LIQUID CRYSTAL DISPLAY DEVICE

CROSS-REFERENCE TO RELATED APPLICATION

The present application claims priority from Japanese application JP 2008-279537 filed on Oct. 30, 2008, the content of which is hereby incorporated by reference into this application.

BACKGROUND OF THE INVENTION

1. Field of the Invention

The present invention relates to a liquid crystal display device, and more particularly to a liquid crystal display device which includes a backlight.

2. Description of the Related Art

A liquid crystal display panel is configured such that an envelope is formed of a pair of substrates which sandwiches liquid crystal therebetween, and optical transmissivity of the liquid crystal display panel is controlled over a plurality of pixels which are formed in the spreading direction of the liquid crystal. Accordingly, a liquid crystal display device is usually provided with a backlight which is a planar light source on a surface (back surface) of the liquid crystal display panel on a side opposite to a viewer.

Such a liquid crystal display device is configured to radiate light from the backlight through the liquid crystal display panel with a relatively large angle with respect to a perpendicular of the liquid crystal display panel. That is, the liquid crystal display device is a liquid crystal display device having a so-called wide viewing angle characteristic which allows a plurality of viewers to observe an image on the liquid crystal display panel simultaneously.

On the other hand, however, there has been also a demand that, for example, only a viewer himself is allowed to observe an image on the liquid crystal display panel. For example, as disclosed in JP-A-1994-59287, there has been known a liquid crystal display device which can adjust a viewing angle state from a wide viewing angle state to a narrow viewing angle state.

The liquid crystal display device disclosed in JP-A-1994-59287 is configured such that a guest-host liquid crystal cell is arranged between a backlight and a liquid crystal display panel and hence, when the guest-host liquid crystal cell is driven, light from the backlight can be radiated with a small angle with respect to a perpendicular of the liquid crystal display panel. The guest-host cell per se can adjust a viewing angle of light which passes through the guest-host liquid cell.

SUMMARY OF THE INVENTION

However, the liquid crystal display device disclosed in JP-A-1994-59287 is configured such that the guest-host liquid crystal cell having a relatively large thickness is interposed between the liquid crystal display panel and the backlight. Accordingly, there arises a drawback that a thickness of the liquid crystal display device is largely increased. Further, the guest-host liquid crystal cell has the relatively complicated configuration thus giving rise to a drawback that a manufacturing cost of the liquid crystal display device is pushed up. Further, the adjustment of a viewing angle of the guest-host liquid crystal cell is performed by applying a voltage to the guest-host liquid crystal cell and hence, there arises a drawback that the increase of power consumption is unavoidable.

It is an object of the invention to provide a liquid crystal display device which can adjust a viewing angle with the simple configuration without incurring the large increase of a thickness and the increase of power consumption.

The liquid crystal display device of the invention is configured such that, for example, two prism sheets are arranged between a liquid crystal display panel and a light guide plate in an overlapping manner, and the prism sheet on a liquid-crystal-display-panel side (first prism sheet) is displaced thus performing a control on whether light which is radiated from the light guide plate and is incident through the prism sheet on a light-guide-plate side (second prism sheet) is allowed to be reflected on the first prism sheet or to pass through the first prism sheet directly so as to adjust a viewing angle.

Further, the liquid crystal display device of the invention may use one prism sheet corresponding to the first prism sheet in place of two prism sheets and may make the light guide plate also play a role of the second prism sheet.

The liquid crystal display device of the invention can be configured as follows, for example.

(1) According to one aspect of the invention, there is provided a liquid crystal display device which includes: a liquid crystal display panel; and a backlight which is arranged on a back surface of the liquid crystal display panel, wherein the backlight includes a light source, a light guide plate, a first prism sheet which is arranged between the liquid crystal display panel and the light guide plate, and a second prism sheet which is arranged between the first prism sheet and the light guide plate, the first prism sheet includes first prisms which are formed parallel to each other in the first direction on a liquid-crystal-display-panel-side surface thereof, the first prism formed on the first prism sheet includes a first inclined surface and a second inclined surface which respectively extend in the second direction which intersects the first direction, assuming light which is emitted from the light source, enters the light guide plate through a side surface of the light guide plate, and is radiated from an upper surface of the light guide plate as a first light, and light which enters the light guide plate through the upper surface of the light guide plate and is radiated from the upper surface of the light guide plate as a second light, the second prism sheet includes second prisms which convert the first light into a third light whose light quantity has the distribution where a magnitude of light quantity is periodically changed at a pitch of the first prisms formed on the first prism sheet in the first direction and allow the third light to be incident on the first prism sheet, the first prism sheet, upon impingement of the third light on the first inclined surfaces, reflects the third light toward a second-inclined-surface side on the first inclined surfaces thus reflecting at least a portion of the third light toward a light-guide-plate side on the second inclined surface, the first prism sheet, upon impingement of the third light on the second inclined surfaces without via the first inclined surfaces, radiates the third light toward a liquid-crystal-display-panel side, and the first prism sheet is displaceable between a first state in a wide viewing angle mode where a rate that the third light impinges on the second inclined surfaces without via the first inclined surfaces is smaller than a rate that the third light impinges on the first inclined surface and a second state in a narrow viewing angle where the rate that the third light impinges on the second inclined surfaces without via the first inclined surfaces is larger than the rate that the third light impinges on the first inclined surface.

(2) In the liquid crystal display device having the configuration (1), the displacement of the first prism sheet may be performed in the first direction.

(3) In the liquid crystal display device having the configuration (1), the displacement of the first prism sheet may be performed in the direction perpendicular to a main surface of the first prism sheet.

(4) In the liquid crystal display device having the configuration (1), the plurality of second prisms which are formed parallel to each other in the first direction may be formed on a first-prism-sheet-side surface of the second prism sheet, the second prism formed on the second prism sheet may include a third inclined surface and a fourth inclined surface which respectively extend in the second direction, and the third light may be radiated from the fourth inclined surfaces.

(5) In the liquid crystal display device having the configuration (1), the second light may be a diffused light.

(6) In the liquid crystal display device having the configuration (1), the liquid crystal display panel may include a pair of substrates which sandwiches liquid crystal therebetween, and the liquid crystal may be driven by an electric field which has components parallel to the pair of substrates.

(7) According to another aspect of the invention, there is provided a liquid crystal display device which includes: a liquid crystal display panel; and a backlight which is arranged on a back surface of the liquid crystal display panel, wherein the backlight includes a light source, a light guide plate, a prism sheet which is arranged between the liquid crystal display panel and the light guide plate, the prism sheet includes first prisms which are formed parallel to each other in the first direction on a liquid-crystal-display-panel-side surface thereof, the first prism formed on the prism sheet includes a first inclined surface and a second inclined surface which respectively extend in the second direction which intersects the first direction, assuming light which is emitted from the light source, enters the light guide plate through a side surface of the light guide plate, and is radiated from an upper surface of the light guide plate as a first light, and light which enters the light guide plate through the upper surface of the light guide plate and is radiated from the upper surface of the light guide plate as a second light, the light guide plate includes, on a lower surface thereof, second prisms which radiate the first light from an upper surface of the light guide plate such that the first light turns into a light whose light quantity has the distribution where a magnitude of light quantity is periodically changed at a pitch of the first prisms formed on the prism sheet in the first direction, the prism sheet, upon impingement of the first light on the first inclined surfaces, reflects the first light toward a second-inclined-surface side on the first inclined surfaces and reflects at least a portion of the first light toward a light-guide-plate side on the second inclined surface, the prism sheet, upon impingement of the first light on the second inclined surfaces without via the first inclined surfaces, radiates the first light toward a liquid-crystal-display-panel side, and the prism sheet is displaceable between a first state in a wide viewing angle mode where a rate that the first light impinges on the second inclined surfaces without via the first inclined surfaces is smaller than a rate that the first light impinges on the first inclined surface and a second state in a narrow viewing angle mode where the rate that the first light impinges on the second inclined surfaces without via the first inclined surfaces is larger than the rate that the first light impinges on the first inclined surface.

(8) In the liquid crystal display device having the configuration (7), the displacement of the prism sheet may be performed in the first direction.

(9) In the liquid crystal display device having the configuration (7), the displacement of the prism sheet may be performed in the direction perpendicular to a main surface of the prism sheet.

(10) In the liquid crystal display device having the configuration (7), a pitch of the second prisms may be equal to a pitch of the first prisms.

(11) In the liquid crystal display device having the configuration (7), the second light may be a diffused light.

(12) In the liquid crystal display device having the configuration (7), the liquid crystal display panel includes a pair of substrates which sandwiches liquid crystal therebetween, and the liquid crystal is driven by an electric field which has components parallel to the pair of substrates.

(13) According to still another aspect of the invention, there is provided a liquid crystal display device which includes: a liquid crystal display panel; and a backlight which is arranged on a back surface of the liquid crystal display panel, wherein the backlight includes a plurality of optical sheets, and at least one optical sheet is displaced so as to adjust a viewing angle.

(14) According to still another aspect of the invention, there is provided a liquid crystal display device which includes: a liquid crystal display panel; and a backlight which is arranged on a back surface of the liquid crystal display panel, wherein the backlight includes a plurality of optical sheets, and at least one optical sheet is moved so as to adjust a viewing angle.

(15) In the liquid crystal display device having the configuration (13), the plurality of optical sheets may be formed of a prism sheet respectively.

(16) In the liquid crystal display device having the configuration (14), the plurality of optical sheets may be formed of a prism sheet respectively.

(17) In the liquid crystal display device having the configuration (13), the displacement may be performed in the horizontal direction.

(18) In the liquid crystal display device having the configuration (13), the displacement may be performed in the vertical direction.

(19) In the liquid crystal display device having the configuration (14), the movement may be performed in the horizontal direction.

(20) In the liquid crystal display device having the configuration (14), the movement may be performed in the vertical direction.

The above-mentioned configurations are merely examples, and the invention can be suitably modified without departing from the technical concept of the invention. Further, configurational examples of the invention other than the above-mentioned configurational examples will become apparent from the description of the whole specification and attached drawings.

The liquid crystal display device having the above-mentioned configurations can adjust a viewing angle in spite of the simple configuration thereof.

Other advantageous effects of the invention will become apparent from the description of the whole specification.

DESCRIPTION OF THE PREFERRED EMBODIMENTS

Embodiments of the invention are explained in conjunction with drawings hereinafter. Here, in all drawings and the respective embodiments, identical or similar configurational parts are given same symbols and their repeated explanation is omitted.

Embodiment 1

Figure 2A:
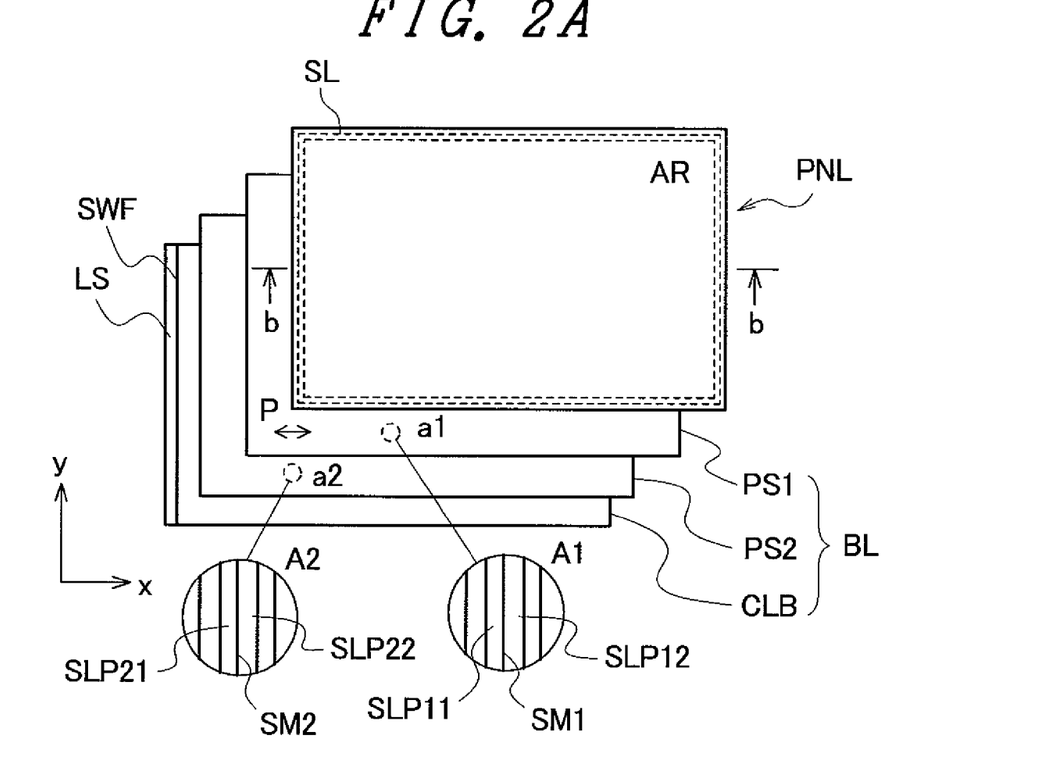
FIG. 2A is a plan view showing the overall configuration of the liquid crystal display device according to the embodiment 1 of the invention.
Figure 2B:
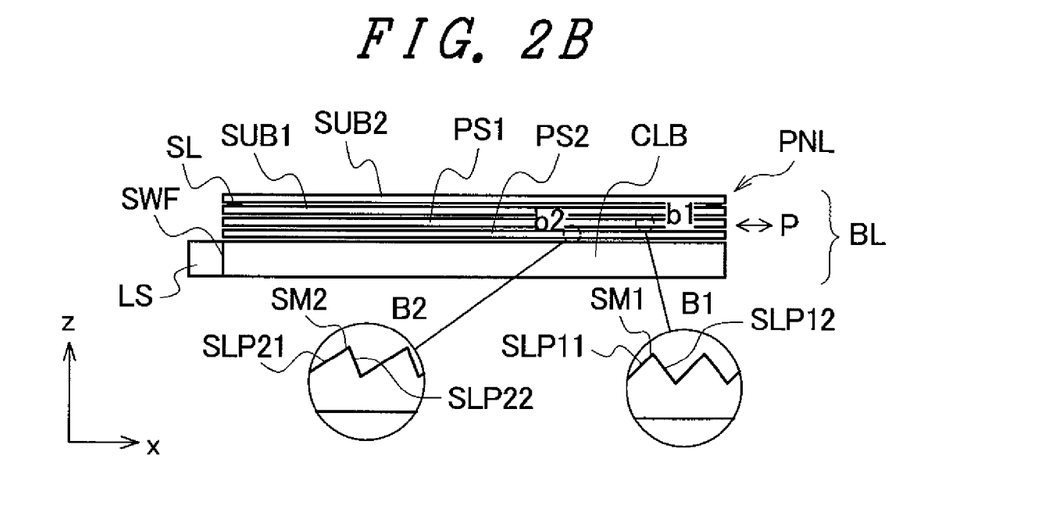
FIG. 2B is a cross-sectional view showing the overall configuration of the liquid crystal display device according to the embodiment 1 of the invention.

FIG. 2A and FIG. 2B are views showing the configuration of a liquid crystal display device according to the embodiment 1 of the invention, wherein FIG. 2A is a plan view of the liquid crystal display device in an exploded state, and FIG. 2B is a cross-sectional view of the liquid crystal display device in a non-exploded state taken along a line b-b in FIG. 2A.

In FIG. 2, the liquid crystal display device is constituted of at least a liquid crystal display panel PNL, a first prism sheet PS1, a second prism sheet PS2, and a light guide plate CLB which are arranged in order from a viewer's side.

The liquid crystal display panel PNL includes an envelope formed of substrates SUB1, SUB2 which are arranged to face each other in an opposed manner with liquid crystal sandwiched therebetween (see FIG. 2B), and an image display part AR which is constituted of a plurality of pixels is incorporated in the envelope. Further, liquid crystal is sealed between the substrates SUB1, SUB2 by a sealing material SL which is formed in a state that the sealing material. SL surrounds the image display part AR. The sealing material SL also adheres the substrates SUB1, SUB2 to each other. The liquid crystal display panel PNL is formed of, for example, a so-called IPS (In Plane Switching) type panel or a so-called lateral-electric-field-type panel, wherein an electric field applied to liquid crystal in each pixel has components parallel to the substrates. The liquid crystal display panel PNL having such a configuration exhibits an excellent wide viewing angle characteristic. Here, although not shown in the drawing, the liquid crystal display panel PNL includes a polarizer arranged on a front face surface side (viewer's side) thereof and a polarizer arranged on a back surface side (backlight BL side) thereof respectively.

In this embodiment, the backlight BL is arranged on a back surface side of the liquid crystal display panel PNL, and includes at least a light source LS, a light guide plate CLB, a first prism sheet PS1 and a second prism sheet PS2.

A plurality of prisms (first prisms) which are arranged parallel to each other in the x direction in the drawing are formed on a liquid-crystal-display-panel-PNL-side surface of the first prism sheet PS1. The plurality of prisms have a triangular shape in which an apex angle is made by a pair of inclined surfaces which extend in the y direction in the drawing. A partially enlarged view A1 shown in FIG. 2A shows an enlarged portion of the prism sheet PS1 in a dotted frame a1, and a partially enlarged view B1 shown in FIG. 2B shows an enlarged portion of the prism sheet PS1 in a dotted frame b1. Both the enlarged views A1, B1 show the above-mentioned prisms formed on the first prism sheet PS1. Here, as shown in the enlarged views A1 and B1, out of the pair of inclined surfaces which forms the apex angle SM1 of the prism, one inclined surface (for example, inclined surface on a left side of the drawing) is referred to as a first inclined surface SLP11, and another inclined surface (for example, inclined surface on a right side of the drawing) is referred to as a second inclined surface SLP12. This definition is made to ease the explanation made later. Further, the above-mentioned liquid crystal display panel PNL, the second prism sheet PS2 and the light guide plate CLB described later respectively assume the positional relationship which is fixed relative to each other, while the first prism sheet PS1 is configured to perform the fine displacement in the x direction as indicated by an arrow P in the drawing.

A plurality of prisms (second prisms) which are arranged parallel to each other in the x direction in the drawing are formed on a first-prism-sheet-PS1-side surface of the second prism sheet PS2. The plurality of prisms have a triangular shape in which an apex angle is made by a pair of inclined surfaces which extends in the y direction in the drawing. A partially enlarged view A2 shown in FIG. 2A shows an enlarged portion of the prism sheet PS2 in a dotted frame a2, and a partially enlarged view B2 shown in FIG. 2B shows an enlarged portion of the prism sheet PS2 in a dotted frame b2. Both the enlarged views A2, B2 show the above-mentioned prisms formed on the second prism sheet PS2. Here, as shown in the enlarged views A2 and B2, out of the pair of inclined surfaces which forms the apex angle SM2 of the prism, one inclined surface (for example, inclined surface on a left side of the drawing) is referred to as a first inclined surface SLP21, and another inclined surface (for example, inclined surface on a right side of the drawing) is referred to as a second inclined surface SLP22. This definition is made to ease the explanation made later. The second prism sheet PS2 is configured to function so as to guide a light from the light guide plate CLB toward a first-prism-sheet-PS1 side.

The backlight BL includes the light guide plate CLB which is arranged to face at least the image display part AR of the liquid crystal display panel PNL in an opposed manner and the light source LS which is arranged to face a side wall surface of the light guide plate CLB in an opposed manner. The light source LS is arranged to face the side wall surface SWF formed on a side of the light guide plate CLB parallel to the y direction in the drawing. Due to such a configuration, a light from the light source LS enters the light guide plate CLB through the side wall surface (side surface) SWF, is reflected on a lower surface (a surface on a side opposite to the second prism sheet PS2) of the light guide plate CLB, for example, and, thereafter, is radiated from an upper surface (a surface on a second-prism-sheet-PS2 side) of the light guide plate CLB. In this case, the light which is radiated from the second-prism-sheet-PS2-side surface of the light guide plate CLB is radiated at small angle with respect to a surface of the light guide plate CLB and hence, the light is made to pass through the second prism sheet PS2 so as to refract the light toward the first-prism-sheet-PS1 side. Here, the light source LS may be a linear light source such as a fluorescent lamp or a spot light source such as an LED.

Figure 1A:
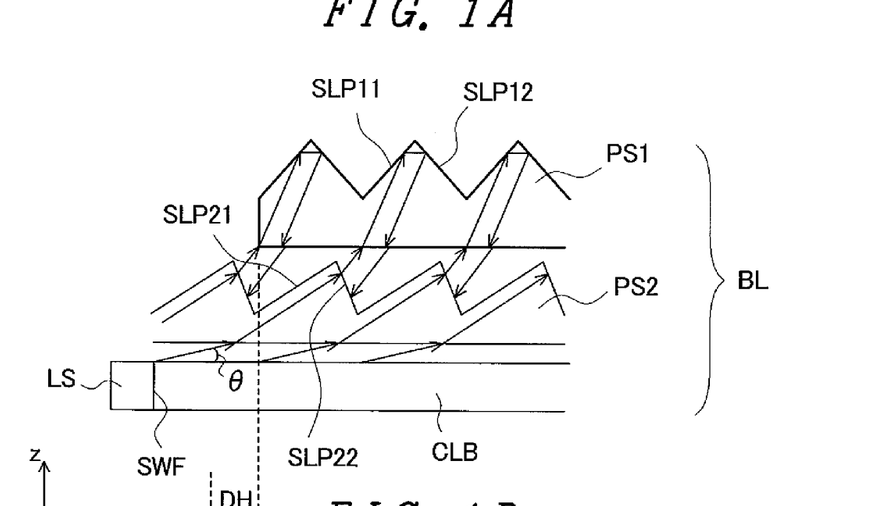
FIG. 1A is a view showing the configuration of an essential part of a liquid crystal display device according to an embodiment 1 of the invention and also is a view showing a state where a path of light from a light guide plate is changed along with the displacement of a first prism sheet.
Figure 1B:
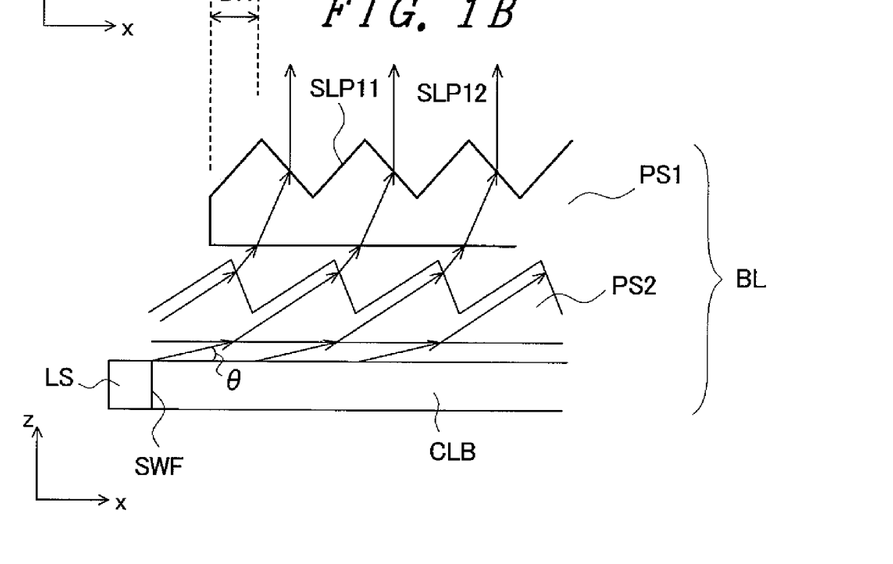
FIG. 1B is a view showing the configuration of an essential part of the liquid crystal display device according to the embodiment 1 of the invention and also is a view showing a state where a path of light from a light guide plate is changed along with the displacement of the first prism sheet.

In the liquid crystal display device having such a configuration, FIG. 1A and FIG. 1B are views showing a state where a path of light from the light guide plate CLB is changed along with the displacement of a first prism sheet PS1.

Both FIG. 1A and FIG. 1B show the light guide plate CLB, the second prism sheet PS2, and the first prism sheet PS1. The difference between the configuration shown in FIG. 1A and the configuration shown in FIG. 1B lies in that, compared to the first prism sheet PS1 shown in FIG. 1A, the first prism sheet PS1 shown in FIG. 1B is displaced by a distance indicated by DH in the drawing, for example. This displacement is generated due to the movement of the first prism sheet PS1 along the x direction in the drawing in FIG. 2A.

FIG. 1A is a view for explaining a state of the liquid crystal display panel PNL in a wide viewing angle mode. Firstly, as shown in FIG. 1A, although not shown in the drawing, a light emitted from the light source LS enters the light guide plate CLB through the side wall surface SWF, is reflected on a surface of the light guide plate CLB on a side opposite to the second prism sheet PS2, for example, and, thereafter, is radiated from the second-prism-sheet-PS2-side surface of the light guide plate CLB. Here, to facilitate the understanding of the invention, the light which is emitted from the light source LS, enters the light guide plate CLB through the side surface of the light guide plate CLB, and is radiated from the upper surface of the light guide plate CLB is referred to as the first light. Here, the first light is radiated at a relatively small angle θ with respect to the front surface of the light guide plate CLB. Here, to differentiate the light which enters the light guide plate CLB through the upper surface of the light guide plate CLB, is reflected on a lower surface of the light guide plate CLB and is radiated from the upper surface of the light guide plate CLB again from the first light, such a light is referred to as the second light.

Next, the first light radiated from the light guide plate CLB is incident on the second prism sheet PS2, and most of the first light is radiated from the second inclined surfaces SLP22 which constitute the prisms. This is because, different from the first inclined surfaces SLP21, the perpendicular direction of the second inclined surfaces SLP22 are arranged to be substantially aligned with an optical path of the first light after the incidence on the second prism sheet PS2. However, the perpendicular direction of the second inclined surfaces SLP22 and the optical path of the first light may not be completely aligned, and a slight inclination may be imparted to the second inclined surfaces SLP22 so as to adjust an angle of the light radiated from the second prism sheet PS2. In this manner, by allowing the light radiated from the second-prism-sheet-PS2-side surface of the light guide plate CLB to pass through the second prism sheet PS2, the light refracted in the inside of the second prism sheet PS2 is sufficiently directed toward the first-prism-sheet-PS1 side. Here, the first inclined surfaces SLP21 are arranged to be substantially aligned with the optical path of the first light after the incidence on the second prism sheet PS2 and hence, there is almost no possibility that the first light is radiated from the first inclined surfaces SLP21.

Figure 3:
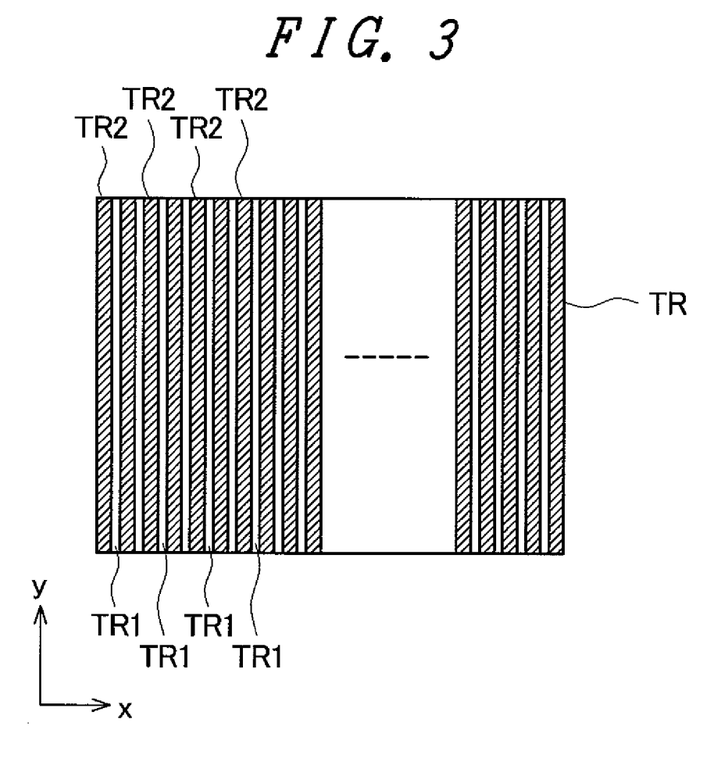
FIG. 3 is a view showing the distribution of magnitude of a light radiated from a second prism sheet of the liquid crystal display device of the invention.

In this case, as described above, most of the light radiated from the second prism sheet PS2 is radiated from the second inclined surfaces SLP22 and hence, the light radiated from the second prism sheet PS2 is directed toward the first-prism-sheet-PS1 side with the distribution of optical quantity where the magnitude of optical quantity is periodically changed in the x direction shown in FIG. 2A. That is, as shown in FIG. 3, in a region TR corresponding to the front surface of the second prism sheet PS2, the optical quantity is large in regions TR2 where the second inclined surface SLP22 is formed, and the optical quantity is small in regions TR1 where the first inclined surface SLP21 is formed.

Accordingly, the second prisms formed on the second prism sheet PS2 has a function of converting the first light into a third light with the distribution of optical quantity where the magnitude of optical quantity is periodically repeated at a pitch of the first prisms formed on the first prism sheet PS1 along the predetermined direction (the direction in which the first prisms of the first prism sheet PS1 are arranged parallel to each other, that is, the x direction in the drawing) and allowing the first light to be incident on the first prism sheet PS1.

Then, the third light radiated from the second prism sheet PS2 is incident on the first prism sheet PS1. Most of the third light (larger than a half of the third light) which is incident on the first prism sheet PS1 is configured to be incident on the first inclined surfaces SLP11 which constitute the prisms when the first prism sheet PS1 is at a position shown in FIG. 1A. Most of the light which is incident on the first inclined surface SLP11 is reflected on the first inclined surface SLP11 and is incident on the second inclined surface SLP12. Most of the light which is incident on the second inclined surfaces SLP12 is directed toward a second-prism-sheet-PS2-side surface of the first prism sheet PS1, and is incident on the second prism sheet PS2. Although an optical path which follows thereafter is not illustrated in the drawing, the light is directed toward a liquid crystal display panel PNL side through a relatively complicated path such that, for example, the light enters the light guide plate CLB again through the upper surface of the light guide plate CLB, is reflected on a lower surface of the light guide plate CLB, and is radiated from the upper surface of the light guide plate CLB again. That is, the light is converted into the second light. The second light is, different from the light having high directivity such as the first light, a diffusion light having components directed in various directions. Accordingly, although the second light passes through the first prism sheet PS1 and the second prism sheet PS2, the second light is incident on the first prism sheet PS1 and the second prism sheet PS2 at angles different from an incident angle of the first light and hence, the second light is radiated from the first prism sheet PS1 and the second prism sheet PS2 at various angles so that, eventually, the second light is incident on the liquid crystal display panel PNL at various angles.

Although a portion of light which is reflected on the first inclined surfaces SLP11 may be radiated from the first prism sheet PS1 without being reflected on the second inclined surfaces SLP12, this light is also reflected on various portions and is incident on the liquid crystal display panel PNL at various angles.

Accordingly, light directed toward the liquid crystal display panel PNL is constituted of lights incident from a large number of directions, and a viewing angle characteristic of the liquid crystal display panel PNL is determined based on properties of the liquid crystal display panel PNL. The liquid crystal display panel PNL is, as described above, formed of a panel having the excellent wide-viewing-angle characteristic and hence, the liquid crystal display panel PNL can acquire a wide viewing angle.

Next, FIG. 1B is a view for explaining a state of the liquid crystal display panel PNL in a narrow viewing angle mode. In FIG. 1B, the first prism sheet PS1 is displaced with respect to the first prism sheet PS1 shown in FIG. 1A by a distance indicated by DH in the drawing. An optical path along which light emitted from the light source LS is incident on the second prism sheet PS2 as the first light and is radiated as the third light is substantially equal to the corresponding optical path shown in FIG. 1A. Then, most of the third light (at least larger than a half of the third light) which is incident on the first prism sheet PS1 from the second prism sheet PS2 is incident on the second inclined surfaces SLP12 without via the first inclined surfaces SLP11. The light which is incident on the first inclined surfaces SLP11 is, based on the law of refraction, radiated in the direction substantially perpendicular to the surface of the liquid crystal display panel PNL (not shown in the drawing) (desirably in the direction which makes 20 degrees or less with respect to the perpendicular direction). The light which is incident on the liquid crystal display panel PNL has directivity in this manner and hence, an image formed by the liquid crystal display panel PNL is displayed as an image having a narrow viewing angle.

It is considered that a portion of the third light impinges on the first inclined surfaces SLP11 and traces the same path taken in the wide viewing angle mode which is explained in conjunction with FIG. 1A. However, a rate of such light is small and hence, visibility when the liquid crystal display panel. PNL is observed from the oblique direction becomes poor so that a narrow viewing angle can be achieved.

Figure 4:
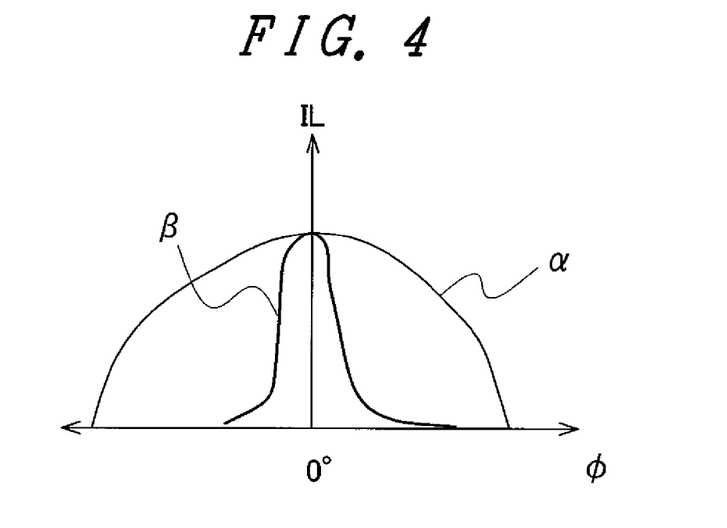
FIG. 4 is a viewing angle characteristic graph showing an advantageous effect brought about by the liquid crystal display device according to the embodiment 1 of the invention.

FIG. 4 is a viewing angle characteristic graph showing an advantageous effect brought about by the liquid crystal display device according to the embodiment 1 of the invention. In FIG. 4, a viewing angle φ is taken on an axis of abscissas and optical intensity IL of a display of the liquid crystal display device is taken on an axis of ordinates. Assume that the viewing angle φ becomes 0° when the liquid crystal display panel PNL is viewed from the perpendicular direction. A characteristic α in the drawing is a characteristic obtained by arranging the first prism sheet PS1 as shown in FIG. 1A. It is understood from the characteristic α that the liquid crystal display panel PNL is excellent in the so-called wide viewing angle where lowering of optical intensity IL is small even when a viewing angle is large. On the other hand, a characteristic β in the drawing is a characteristic obtained by arranging the first prism sheet PS1 as shown in FIG. 1B. It is understood from the characteristic β that the liquid crystal display panel PNL is excellent in the so-called narrow viewing angle where optical intensity IL is large only when a viewer observes an image at an angle substantially perpendicular to the display screen and is sharply decreased in a midst of the increase of a viewing angle.

The above-mentioned displacement of the first prism sheet PS1 is brought about by a switching means not shown in the drawing which is manually operated, for example. When an operation mode is changed over to one mode out of two modes, for example, by operating the switching means, the first prism sheet PS1 may take the arrangement shown in FIG. 1A, and when the operation mode is changed over to the other mode, the first prism sheet PS1 may take the arrangement shown in FIG. 1B. Further, in the above-mentioned explanation, the first prism sheet PS1 is displaced relative to the second prism sheet PS2 by a distance DH (corresponding to approximately half pitch of the prisms). However, an amount of displacement is not limited to the distance DH, and may be odd times as large as the distance DH. In other words, it is sufficient that the arrangement of the first prism sheet PS1 relative to the second prism sheet PS2 assume at least the state shown in FIG. 1A and the state shown in FIG. 1B. That is, it is sufficient that the first prism sheet PS1 is displaceable between a first state in the wide viewing angle mode where a rate that the third light impinges on the second inclined surfaces SLP12 without via the first inclined surfaces SLP11 is smaller than a rate that the third light impinges on the first inclined surface SLP11 and a second state in a narrow viewing angle mode where the rate that the third light impinges on the second inclined surfaces SLP12 without via the first inclined surfaces SLP11 is larger than the rate that the third light impinges on the first inclined surfaces SLP11.

According to the liquid crystal display device having such a configuration, it is possible to change over the viewing angle between the wide viewing angle and the narrow viewing angle by displacing or moving the first prism sheet PS1 and hence, the configuration of the liquid crystal display device can be simplified. Further, it is sufficient to interpose the first prism sheet PS1 and the second prism sheet PS2 between the liquid crystal display panel PNL and the light guide plate CLB and hence, it is no more necessary to largely increase a thickness of the liquid crystal display device. Further, it is unnecessary to use an element such as a guest-host liquid crystal cell and hence, it is possible to obviate the increase of power consumption.

Embodiment 2

Figure 5A:
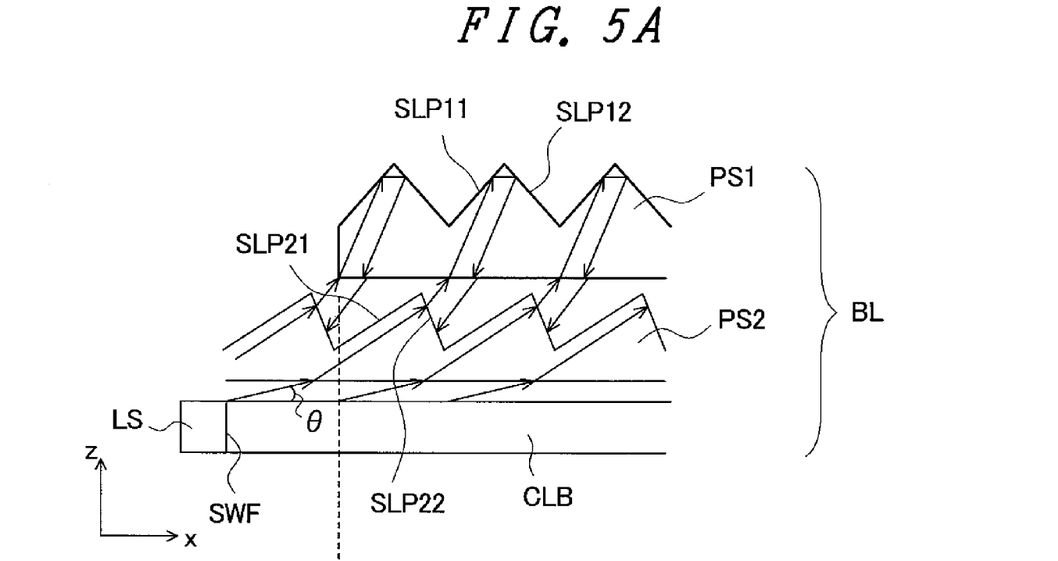
FIG. 5A is a view showing the configuration of a liquid crystal display device according to an embodiment 2 of the invention.
Figure 5B:
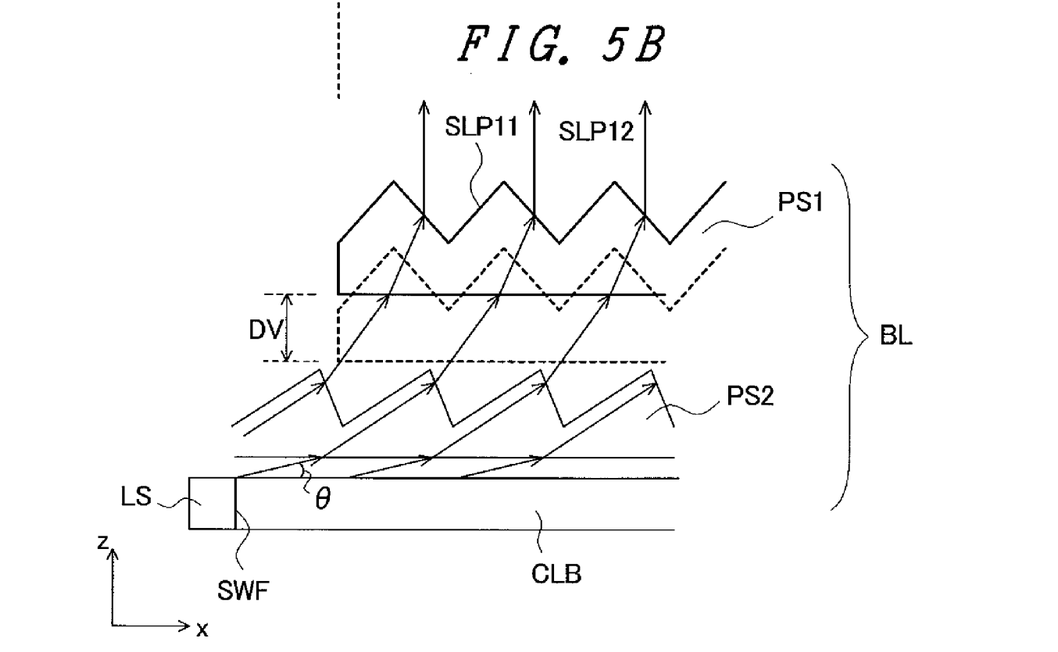
FIG. 5B is a view showing the configuration of the liquid crystal display device according to the embodiment 2 of the invention.

FIG. 5A and FIG. 5B are views showing the configuration of a liquid crystal display device according to an embodiment 2 of the invention, and are drawn corresponding to FIG. 1A and FIG. 1B.

The configuration of the liquid crystal display device shown in FIG. 5A and FIG. 5B differs from the configuration of the liquid crystal display device shown in FIG. 1A and FIG. 1B with respect to a point that the first prism sheet PS1 is displaced in the vertical direction with respect to a main surface of the first prism sheet PS1. That is, in FIG. 5B, the first prism sheet PS1 is displaced in the z direction in the drawing from a position shown in FIG. 5A (indicated by a dotted line in FIG. 5B) by a distance DV in the drawing.

Also in such a case, most of the third light which is incident on the first prism sheet PS1 from the second prism sheet PS2 in FIG. 5B is incident on the second inclined surfaces SLP12 of the first prism sheet PS1 without via the first inclined surfaces SLP11 of the first prism sheet PS1 and hence, this embodiment 2 can acquire the substantially same advantageous effects as the embodiment 1.

However, an amount of displacement of the first prism sheet PS1 relative to the second prism sheet PS2 is not limited to the distance DV. It is sufficient that the arrangement of the first prism sheet PS1 relative to the second prism sheet PS2 assume at least the state shown in FIG. 5A and the state shown in FIG. 5B. That is, it is sufficient that the first prism sheet PS1 is displaceable between a first state in the wide viewing angle mode where a rate that the third light impinges on the second inclined surfaces SLP12 without via the first inclined surfaces SLP11 is smaller than a rate that the third light impinges on the first inclined surface SLP11 and a second state in a narrow viewing angle mode where the rate that the third light impinges on the second inclined surfaces SLP12 without via the first inclined surfaces SLP11 is larger than the rate that the third light impinges on the first inclined surfaces SLP11.

Embodiment 3

In the above-mentioned embodiments, the configuration for acquiring the wide viewing angle and the configuration for acquiring the narrow viewing angle are exemplified. In the above-mentioned embodiments, the switching means which changes over these configurations is also exemplified. However, the invention is not limited to such configurations and switching means. That is, the displacement of the first prism sheet may be performed such that the first prism sheet may be displaced in three or more stages which differ in width of viewing angle from each other using the above-mentioned switching means. Further, the first prism sheet may be displaced continuously without limiting the number of stages. All these cases, however, include at least the wide viewing angle mode and the narrow viewing angle mode explained in conjunction with the embodiments 1, 2.

Embodiment 4

Figure 6A:
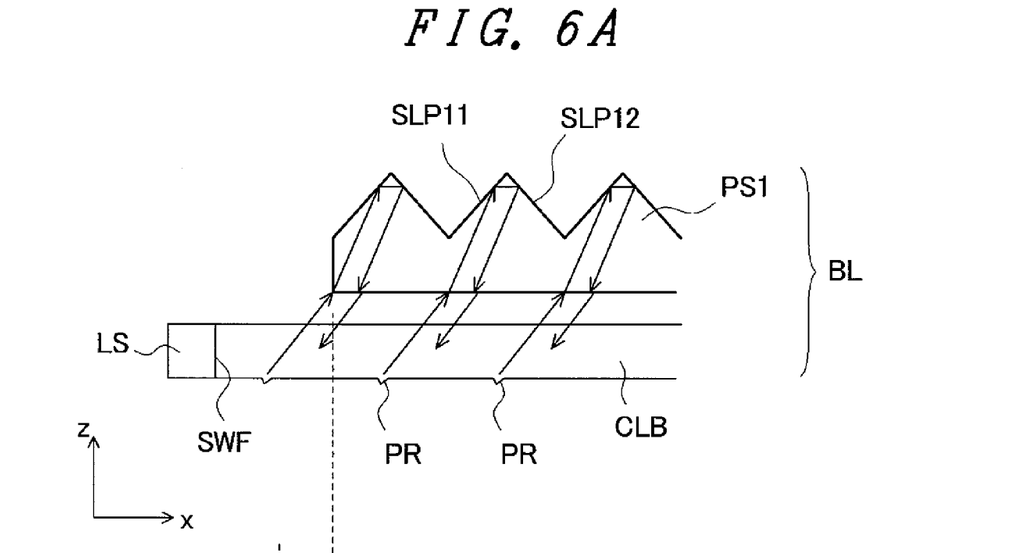
FIG. 6A is a view showing the configuration of a liquid crystal display device according to an embodiment 4 of the invention.
Figure 6B:
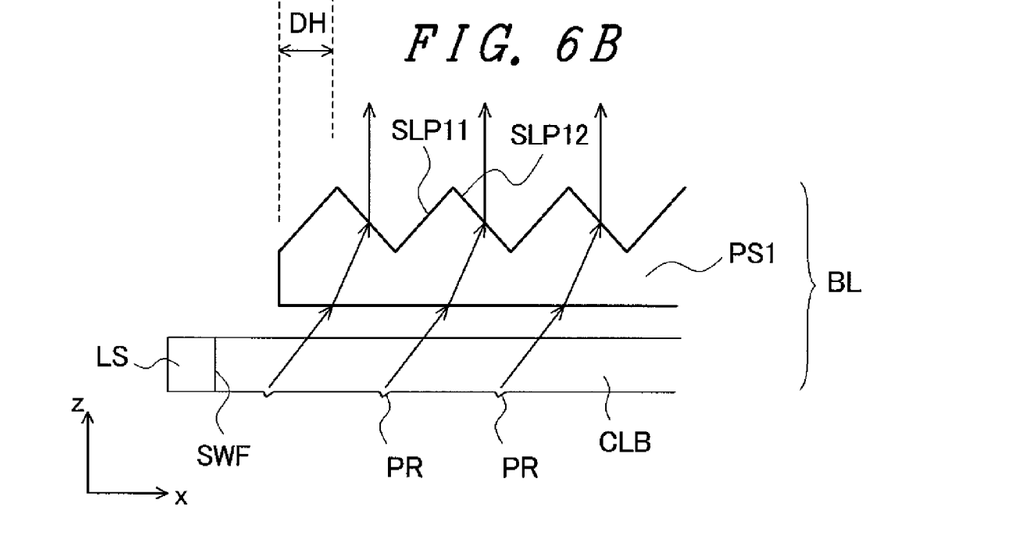
FIG. 6B is a view showing the configuration of the liquid crystal display device according to the embodiment 4 of the invention.

FIG. 6A and FIG. 6B are views showing the configuration of a liquid crystal display device according to an embodiment 4 of the invention, and are drawn corresponding to FIG. 1A and FIG. 1B.

In the embodiment 4, the liquid crystal display device does not include the second prism sheet PS2. Instead, projecting portions PR which extend in the x direction in FIG. 2A and are arranged parallel to each other in the y direction are formed on a lower surface of the light guide plate CLB (a surface of the light guide plate CLB on a side opposite to the first prism sheet PS1), and a pitch of the projecting portions PR is set equal to a pitch of the prisms formed on the first prism sheet PS1. The projecting portions PR have the same function as prisms. That is, the projecting portions PR reflect the light which is emitted from the light source LS and enters the light guide plate CLB through the side surface of the light guide plate CLB, and radiate the light toward the first prism sheet PS1 side from the upper surface of the light guide plate CLB as the first light.

The first light acquires the distribution of magnitude of light shown in FIG. 3 on the first-prism-sheet-PS1-side surface of the light guide plate CLB. Accordingly, the projecting portions PR formed on the light guide plate CLB have the similar function as the second prism sheet PS2. That is, the first light in the embodiment 4 is in the same stage as the third light in the embodiment 1. The explanation of an optical path in the inside of the first prism sheet PS1 of this embodiment 4 is substantially equal to the optical path of the third light in the embodiment 1 except for that the third light in the embodiment 1 is replaced with the first light in the embodiment 4. Accordingly, this embodiment 4 can acquire the substantially equal advantageous effects as the embodiment 1. The embodiment 4 may be applicable to the embodiment 2 or 3.

Embodiment 5

The above-mentioned embodiments adopt the so-called lateral-electric-field-type liquid crystal display panel or the so-called IPS-type liquid crystal display panel as the liquid crystal display panel PNL. However, the invention is not limited to these panels, and a so-called vertical-electric-field-type liquid crystal display panel such as a TN (Twisted Nematic)-type liquid crystal display panel or a VA-type liquid crystal display panel may be used as the liquid crystal display panel PNL.

Although the invention has been explained in conjunction with the embodiments, the configurations explained with respect to the respective embodiments are merely examples and the invention may be suitably modified without departing from the technical concept of the invention. Further, the configurations explained with respect to the respective embodiments may be combined to each other unless these embodiments contradict each other.

What is claimed is:

1. A liquid crystal display device comprising:
a liquid crystal display panel; and
a backlight which is arranged on a back surface of the liquid crystal display panel, wherein
the backlight includes a light source, a light guide plate, a first prism sheet which is arranged between the liquid crystal display panel and the light guide plate, and a second prism sheet which is arranged between the first prism sheet and the light guide plate,
the first prism sheet includes first prisms which are formed parallel to each other in the first direction on a liquid-crystal-display-panel-side surface thereof,
the first prism formed on the first prism sheet includes a first inclined surface and a second inclined surface which respectively extend in the second direction which intersects the first direction,
assuming light which is emitted from the light source, enters the light guide plate through a side surface of the light guide plate, and is radiated from an upper surface of the light guide plate as a first light, and light which enters the light guide plate through the upper surface of the light guide plate and is radiated from the upper surface of the light guide plate as a second light,
the second prism sheet includes second prisms which convert the first light into a third light whose light quantity has the distribution where a magnitude of light quantity is periodically changed at a pitch of the first prisms formed on the first prism sheet in the first direction and allow the third light to be incident on the first prism sheet,
the first prism sheet, upon impingement of the third light on the first inclined surfaces, reflects the third light toward a second-inclined-surface side on the first inclined surfaces thus reflecting at least a portion of the third light toward a light-guide-plate side on the second inclined surface,
the first prism sheet, upon impingement of the third light on the second inclined surfaces without via the first inclined surfaces, radiates the third light toward a liquid-crystal-display-panel side, and
the first prism sheet is displaceable between a first state in a wide viewing angle mode where a rate that the third light impinges on the second inclined surfaces without via the first inclined surfaces is smaller than a rate that the third light impinges on the first inclined surface and a second state in a narrow viewing angle where the rate that the third light impinges on the second inclined surfaces without via the first inclined surfaces is larger than the rate that the third light impinges on the first inclined surfaces.

2. A liquid crystal display device according to claim 1, wherein a displacement of the first prism sheet is performed in the first direction.

3. A liquid crystal display device according to claim 1, wherein a displacement of the first prism sheet is performed in the direction perpendicular to a main surface of the first prism sheet.

4. A liquid crystal display device according to claim 1, wherein the plurality of second prisms which are formed parallel to each other in the first direction are formed on a first-prism-sheet-side surface of the second prism sheet,
- the second prism formed on the second prism sheet includes a third inclined surface and a fourth inclined surface which respectively extend in the second direction, and
- the third light is radiated from the fourth inclined surfaces.

5. A liquid crystal display device according to claim 1, wherein the second light is a diffused light.

6. A liquid crystal display device according to claim 1, wherein the liquid crystal display panel includes a pair of substrates which sandwiches liquid crystal therebetween, and the liquid crystal is driven by an electric field which has components parallel to the pair of substrates.

\* \* \* \* \*